3,167,567
PRODUCTION OF PHTHALIC ANHYDRIDE BY CATALYTIC OXIDATION OF o-XYLENE
Helmut Nonnenmacher, Max Appl, Konstantin Andrussow, and Juergen Haug, all of Ludwigshafen (Rhine), Germany, assignors to Badische Anilin- & Soda-Fabrik Aktiengesellschaft, Ludwigshafen (Rhine), Germany
No Drawing. Filed Apr. 24, 1962, Ser. No. 189,704
Claims priority, application Germany, Sept. 27, 1961, B 64,151
5 Claims. (Cl. 260—346.4)

This invention relates to the production of phthalic anhydride by catalytic oxidation of o-xylene in a fluidized bed.

It is known that phthalic anhydride can be prepared by oxidation of naphthalene or o-xylene with oxygen-containing gases, especially with air, at a temperature between about 300° and about 550° C. in the presence of catalysts. The catalyst may be rigidly arranged in the oxidation chamber or may be in fluidized condition. Many suitable catalysts have already been described, the active components of which are vanadium compounds. It is also known to use the catalysts with or without a carrier.

Catalysts consisting of vanadium pentoxide, potassium pyrosulfate and silicic acid have proved to be suitable for the oxidation of naphthalene. Much poorer yields are obtained with these catalysts in the oxidation of o-xylene. Either a lower conversion is achieved or a lower yield of phthtalic anhydride, whereas a considerable portion of the o-xylene is burnt to carbon monoxide and carbon dioxide.

It is an object of this invention to provide a process by which o-xylene can be oxidized by the use of known catalysts or catalysts described in the copending application Serial No. 189,701, filed by Helmut Nonnenmacher, Konstantin Andrussow, Max Appl, Anton Feinauer, Juergen Haug, Alfred Helms, and Klaus Wiebusch, with better yields of o-phthalic anhydride.

Another object of this invention is to provide a process by which o-xylene can be oxidized to phthalic anhydride with both a high conversion and high yields.

A further object of the invention is to provide a process by which catalysts hitherto thought to be suitable solely for oxidation of naphthalene can also be used for the oxidation of o-xylene.

These and other objects are achieved by passing o-xylene with oxygen or an oxygen-containing inert gas together with chlorine or a chlorine compound which is gaseous or vaporous under the reaction conditions, at a temperature of 250° to 380° C. in the vapor phase with residence periods of five to fifty seconds over a catalyst, said catalyst consisting at the reaction temperature of a molten liquid solution distributed on a highly porous carrier, especially silica gel, said molten liquid solution being formed from vanadium pentoxide with or without other additives in potassium pyrosulfate or a mixture of sodium pyrosulfate and potassium pyrosulfate.

The catalysts which may be used, for the oxidation of o-xylene are described for example in Belgian patent specification No. 592,605 and in the copending application No. 189,701, filed by Helmut Nonnenmacher, Konstantin Andrussow, Max Appl, Anton Feinauer, Juergen Haug, Alfred Helms, and Klaus Wiebusch. They may be prepared for example by applying a melt of the alkali pyrosulfate or pyrosulfates, in which vanadium pentoxide with or without other additives has been dissolved, to a large-surface carrier having a high pore volume. A characteristic of the catalysts is that the active substance is contained as a thin liquid solution in the pores of the catalyst support under the reaction conditions for o-xylene oxidation. The catalyst thus constitutes a two-phase system.

Aluminum phosphate, synthetic or natural silicates, silicic acid, especially in the form of silica gel, or active carbon may be used for example as large-surfaced carriers. Silica gel which has been obtained by precipitation of silica sol, subsequent drying, calcining and size reduction, is eminently suitable. It is used in a grain size of 10 to 3000 microns, especially of 20 to 600 microns and advantageously 20 to 300 microns; the internal surface should be about 200 to about 400 square meters per gram, especially 300 to 360 square meters per gram and the means pore radius should be about 50 to about 80 A. The large-surface carrier may also be used in the form of microballs which may be obtained by spray drying aqueous concentrates.

When active carbon of the grain size range of about 20 to about 600 microns is used, the temperature during the production of the catalyst and in the oxidation should as a rule not exceed 300° to 340° C. because otherwise combustion of the active carbon in the air stream will occur.

For the production of the molten liquid solution of pyrosulfate containing vanadium pentoxide and any other additives, potassium pyrosulfate or potassium hydrogen sulfate or a mixture of potassium and sodium pyrosulfates or hydrogen sulfates, with or without water, is heated and fused until the water has evaporated. Then at about 300° to about 450° C., the vanadium compounds, especially vanadium pentoxide or ammonium vanadate, and any other additives, are dissolved in the melt. It is preferred to use a mixture of sodium pyrosulfate and potassium pyrosulfate, especially a mixture having 10 to 50% by weight of sodium pyrosulfate.

In addition to the vanadium compounds specified, other vanadium compounds may be added which under oxidizing conditions are converted at the reaction temperature into vanadium pentoxide, for example vanadium trichloride, vanadium trioxide, vanadium tetroxide or vanadyl sulfate ($VOSO_4$). The amount of vanadium compound used is such that the melt contains 5 to 30% by weight of vanadium pentoxide. It is preferred to use melts which contain 10 to 20% by weight of vanadium pentoxide.

It is advantageous also to dissolved in the said molten solution metal activators which accelerate the oxidation of hydrogen chloride to chlorine, in an amount of up to 5% by weight with reference to the molten liquid solution. Such activators are compounds, especially oxidic compounds, of iron, nickel and cobalt and especially of cerium, copper and manganese. Examples are ceric oxide, manganese dioxide, ferric oxide, cupric oxide, cobaltous oxide and nickelous oxide. Catalysts with additions of such activators have not hitherto been used for oxidation of o-xylene.

Phosphoric acid, molybdenum trioxide and/or tungsten trioxide may be used for example as further additions to the vanadium pentoxide.

Phosphoric acid may be used as such or in the form of phosphorus pentoxide or in the form of compounds which yield phosphoric acid. Thus phosphorus pentasulfide, ammonium phosphate, sodium phosphate or potassium phosphate as primary, secondary or tertiary phosphates may be used. When using alkali phosphates, an amount of sulfuric acid equivalent to the alkali must be added and regarded as pyrosulfate. The phosphorus compounds are added in such an amount that a maximum of 4% by weight of phosphorus pentoxide is present in the molten liquid solution. The weight ratio of phosphorus pentoxide to vanadium pentoxide should not exceed 1:6. The phosphorus pentoxide has no appreciable effect if the weight ratio is below 1:200.

Any molybdenum compounds added may take the form for example of molybdic acid, molybdenum oxides, molybdenum sulfide or ammonium molybdate. It is however also possible to use sodium molybdate, potassium molybdate or advantageously phosphomolybdic acid. The content of alkali is preferably compensated for by adding sulfuric acid. Regard should be had to the alkali and/or phosphorus content of the added molybdenum compounds in the amount of pyrosulfate or phosphoric acid.

Instead of molybdenum compounds, tungsten compounds may be added, for example tungstic acid, tungsten oxides, tungsten sulfides, ammonium tungstate or phosphotungstic acid. Mixtures of molybdenum and tungsten compounds may also be added. The molybdenum and/or tungsten compounds are added in an amount such that the proportion thereof in the molten solution is up to 6% by weight of molybdenum trioxide (or an equivalent amount of tungsten trioxide) and the weight ratio of molybdenum trioxide or tungsten trioxide to vanadium pentoxide is not more than 1:3. The effect of molybdenum and/or tungsten oxides is only noticeable at weight ratios above 1:20.

The catalysts may be further activated by a further addition, for example of 1 to 10% by weight of silver oxide with reference to vanadium pentoxide or up to 3% by weight with reference to the solution.

The total amount of vanadium pentoxide, the oxidation catalyst for hydrogen chloride which is advantageously added and any other additions of phosphoric acid, molybdenum and/or tungsten oxides and silver oxide used, in the pyrosulfate melt should not be more than 40% by weight (calculated as oxides) of the molten mixture or two-thirds of the pyrosulfate.

It is advantageous to prepare the pyrosulfate melt containing vanadium pentoxide and an addition of the said kind in the desired mixing proportions, allow the melt to solidify, reduce it in size and then apply it to the carrier.

Different methods may be used to apply the pyrosulfate melts containing vanadium pentoxide and any other additions to the carrier substance. For example the solidified fused material which has been ground to a grain size of about 200 microns or less may be mixed in a mixing drum with an appropriate amount of silica carrier and the whole then heated for several hours at temperatures above the melting temperature, for example at 300° to 450° C. The melt, which is liquefied in the process, is absorbed by the pores of the carrier material. It is advantageous to agitate the carrier to assist in uniform distribution of the melt. This may be effected for example in a heated agitated vessel or in a heated screw conveyer. Another method comprises allowing the powdered fused material to trickle into the carrier material, for example silica gel, which is fluidized by air or an inert gas, for example nitrogen or carbon dioxide, and allowing it to remain for a period, for example 8 hours, at a temperature above the melting temperature of the molten mixture. To homogenize the catalyst it may be kept in fluidized motion for some time in an air stream or in a stream of oxygen-containing gas at the reaction temperature for some time prior to use.

The said catalysts may however also be prepared by soaking silica gel with aqueous solutions of the above-mentioned components, and in this case the corresponding sulfates, if desired with the addition of sulfuric acid, may be used instead of potassium pyrosulfate or potassium-sodium pyrosulfate mixtures. The impregnated catalyst is then dried and heated at temperatures of 200° to 600° C., especially at 250° to 450° C. When using alkali sulfates instead of alkali pyrosulfates it is necessary, in order to achieve the two-phase system in which a liquid melt is present in the pores of the catalyst support, to supply gas containing sulfur trioxide, or sulfur dioxide, or sulfur compounds which give sulfur trioxide at the catalyst, together with oxygen-containing gas during the heating, a temperature of about 250° to 500° C., especially 300° to 450° C., being maintained. By this treatment, the components present on the catalyst support in solid form are converted into a liquid alkali pyrosulfate melt in which vanadium and any other additives are dissolved.

The relative proportions of pyrosulfate melt, which contains vanadium pentoxide and any other additions, and carrier may be varied within a certain range. It is advantageous to use at least 10% by weight of the said molten solution with reference to the catalyst; the upper limit for the proportion of molten solution in the catalyst depends largely on the nature of the carrier used. Too high a proportion leads as a rule to agglomeration and sticking together of the catalyst granules, for example a proportion of more than 60% by weight with reference to the catalyst when using silica gel as the carrier. It is therefore preferred to use 25 to 50% by weight of the molten mixture with reference to the catalyst, especially when using silica gel as the carrier.

The maintenance of definite reaction temperatures is essential for the process according to this invention. The oxidation is conveniently carried out at 250° to 380° C., advantageously at 270° to 350° C. The reaction temperature must however be sufficiently high for the active constituents of the catalyst in the carrier to be in liquid form. The lower limit of temperature depends therefore on the melting temperature of the molten liquid solution present in the pores of the catalyst carrier used.

Flow velocity of the gases and vapours and the height of the fluidized bed should be correlated so that residence periods of five to fifty seconds, especially of eight to thirty seconds, are obtained. Residence period is defined as usual, i.e. it is the period during which the o-xylene is in contact with the catalyst, reference being had to the whole of the reaction chamber regarded as free from catalyst.

Residence period =

$$\frac{\text{catalyst chamber volume}}{\text{gas volume per second (referred to the pressure and temperature in the catalyst chamber)}}$$

A further feature of the invention is the addition of chlorine or a chlorine compound which is gaseous or vaporous at the conditions prevailing at the catalyst. Examples of chlorine compounds which may be used are inorganic compounds, such as hydrogen chloride, ammonium chloride, nitrosyl chloride and thionyl chloride, or organic compounds, such as alkyl chlorides with 1 to 10 carbon atoms, aryl chlorides with 6 to 10 carbon atoms, aralkyl chlorides with 7 to 9 carbon atoms, carboxylic acid chlorides of fatty acids with 2 to 10 carbon atoms or of aryl monocarboxylic or dicarboxylic acids with 7 to 10 carbon atoms or of aralkylcarboxylic acids with 8 to 10 carbon atoms. For example ethyl chloride, hexyl chloride, benzyl chloride and, especially advantageously, o-xylyl chloride, o-xylene dichloride or o-xylylidene dichloride may be used.

Chlorine or a chlorine compound is added in such an amount that in the catalyst chamber a weight ratio of chlorine supplied to xylene supplied of 2:100 to 1:100,000 is set up.

Under otherwise identical conditions, better yields of phthalic anhydride can be obtained by increasing the amount of chlorine. For a given catalyst, a given temperature and a given resistance period, however, there is a maximum amount of chlorine above which further addition of chlorine gives no appreciable increase in the yield of phthalic anhydride. It is however desirable to work with amounts of chlorine which are not too high because working up the reaction product to pure phthalic anhydride is made more difficult with increasing chlorine addition and large amounts of chlorine may furthermore lead to undesirable corrosion phenomena.

Chlorine, which is supplied in free or combined form to the oxidation chamber, is obtained almost completely in the form of hydrogen chloride in the off-gas which leaves the reaction chamber. The deposited crude phthalic anhydride contains only about 1% of chlorine in organic combination. The said chlorine-containing impurities may be removed from the phthalic anhydride by suitable measures.

To achieve optimum results, catalyst, temperature, residence period and amount of chlorine must be correlated to each other. For example it is advantageous to use an amount of chlorine of 5 to 50 grams per 100 g. of o-xylene supplied in the case of catalysts which contain only vanadium in the alkali pyrosulfate melt. With potassium pyrosulfate as the alkali pyrosulfate component, the optimum working temperature is as a rule at 340° C. or higher. When using catalysts which, besides vanadium, also contain in the alkali pyrosulfate melt, substances which promote the oxidation of hydrogen chloride to chlorine, as for example compounds of cerium, of copper or of manganese, and which may also contain phosphoric acid and molybdic acid, it is possible to achieve optimum results with smaller amounts of chlorine, if desired in the form of volatile compounds containing chlorine. Amounts of chlorine of 0.2 to 10 g. per 100 g. of o-xylene have proved to be suitable. As a rule the most favorable working temperature for these catalysts is below 340° C.

It is advantageous to carry out the reaction in the presence of sulfur trioxide at the catalyst and therefore to add to the catalyst chamber small amounts of sulfur trioxide or sulfur dioxide or sulfur compounds which are oxidized to sulfur trioxide at the catalyst under the reaction conditions. Examples of sulfur compounds are thiophene, carbon disulfide and thionaphthene. The sulfur compounds are added at the rate of 1 to 500 g. per kg. of catalyst per month, calculated as sulfur dioxide, or 1.2 to 620 g. calculated as sulfur trioxide. The supply may be continuous or periodical.

Supply of sulfur is advantageous for maintaining catalyst activity over long periods. If the amount of sulfur added is too small, the catalyst declines in its activity when the reaction conditions are otherwise maintained the same, and it is then necessary to raise the reaction temperature. A decline in catalyst activity also occurs when the sulfur content is too high.

The selectivity of the process, i.e. the ratio of phthalic anhydride to carbon dioxide and carbon monoxide in mole percent is lower with increasing temperature. On the other hand, the conversion of xylene falls with decreasing temperature. Moreover selectivity and conversion depend on the catalyst.

When chlorine or chlorine compounds are present at the same time, an increase in conversion takes place as a rule; moreover an improvement in selectivity is achieved. In the following table, conversion, selectivity and yield are given for a catalyst of the composition: 8.1% of $V_2O_5$, 36.9% of $K_2S_2O_7$, 55.0% of $SiO_2$ at a temperature of 340° C. with and without adding chlorine (in the form of hydrogen chloride) with a residence period of 32 seconds and a load of 87.5 g. of o-xylene per m.$^3$ (S.T.P.) of air.

TABLE

| Percent by weight of chlorine with reference to o-xylene | Conversion of o-xylene in mole percent | Yield of phthalic anhydride in mole percent | Selectivity |
|---|---|---|---|
| 42 | 99.2 | 65.8 | 2.00 |
| 21 | 99 | 65.5 | 1.99 |
| 9 | 98.3 | 58.4 | 1.47 |
| 0 | 98.3 | 38.3 | 0.65 |

98 to 100% o-xylene may be used as initial material but xylene mixtures may also be used which contain not only o-xylene but also up to 10% of m-xylene, p-xylene and/or ethylbenzene. Under the reaction conditions the last-mentioned compounds substantially burn to carbon dioxide or carbon monoxide. Oxygen is used as such or together with inert gases, for example with nitrogen or carbon dioxide. It is simplest to use air (containing 20% of oxygen). Gas mixtures containing less oxygen, for example 12 to 15% of oxygen, may however also be used. The o-xylene is introduced for example in an amount of 30 to 180 g. per m.$^3$ (S.T.P.) of air, especially 75 to 150 g./m.$^3$ (S.T.P.) of air, which corresponds to 150 to 900 g., especially 375 to 750 g. of xylene per m.$^3$ (S.T.P.) of oxygen, into the fluidized bed of catalyst kept at the reaction temperature. The gas stream containing xylene is obtained for example by saturating a partial stream of gas and mixing it with the main stream, by evaporation into the gas stream or by injection, if desired by means of a stream of auxiliary gas, for example nitrogen. The mixture containing xylene may also be supplied separately from the oxygen-containing gas required for the reaction.

The initial concentration of xylene equivalent to the above values is from 0.6 to 3.8% by volume. By using a nozzle it is also possible to introduce the o-xylene in liquid form direct into the catalyst bed fluidized by oxidation gases.

The chlorine or chlorine-containing volatile compound may be premixed with the o-xylene and introduced into the reaction chamber in the manner described above for o-xylene. The supply of chlorine may however also be effected by means of the oxygen-containing gas stream by metering the chlorine or chlorine-containing compound into the said gas stream. The chlorine or chlorine-containing compound may also be introduced direct into the reaction chamber separately from the other gaseous or vaporous reactants by means of an inert gas stream, for example nitrogen or carbon dioxide.

The process may be carried out at normal pressure, slightly increased pressure, for example up to 3 atmospheres, or higher pressures, for example at 5 to 25 atmospheres.

The catalyst is kept in fluidized motion in a quartz tube in small plant and in a tube of iron or alloy steel, for example V2A-steel, in larger plant. Distribution of the gas is carried out at the lower end of the reaction tube, which may be conically constricted, through a plate of ceramic or metallic sintered material or through an annular gap produced by a conical insert. When using smaller reaction tubes, abstraction of heat may take place through the wall of the reaction tube, for example by air cooling or by means of a salt melt, while in larger systems the installation of cooling coils in the fluidized bed is necessary to abstract the reaction heat. The heat is then utilizable for steam production.

The following examples will further illustrate the invention without limiting it.

EXAMPLE 1

*(a) Production of the catalyst*

4920 g. of potassium pyrosulfate is fused in a crucible furnace and kept at a temperature of 350° C. Then 1080 g. of vanadium pentoxide is introduced while stirring. After the end of the introduction, the mixture is kept at 350° C. for another hour. After cooling and solidifying the melt, it is ground to a grain size of less than 150 microns.

5900 g. of the powdered material is mixed in a mixing drum with 7220 g. of silica gel having a grain size of 60 to 200 microns, an average pore diameter of about 54 A. units and an inner surface of about 360 m.$^2$ per gram, the melt then being heated with constant mixing to 350° C. within four hours in a V2A-steel reactor. This temperature is maintained for another four hours. After cooling the melt, the finished catalyst is passed through a sieve with a mesh width of 300 microns. The catalyst has the following composition: 8.1% by weight of $V_2O_5$, 36.9% by weight of $K_2S_2O_7$ and 55% by weight of $SiO_2$.

*(b) Oxidation of xylene*

10.5 liters of the catalyst prepared according to (*a*)

is charged to a vertical, electrically heated reaction tube of V2A-steel 80 mm. in diameter and 3000 mm. in length. The reactor is filled to a height of 2100 mm. 52.7 g. of o-xylene per hour is vaporized in a vaporizer into an air stream of 600 liters (S.T.P.) per hour. To the air stream containing xylene in an amount of 87.5 g. per m. (S.T.P.) hydrogen chloride is added at a rate of 14 liters (S.T.P.) per hour, equivalent to 42.1% of chlorine with reference to o-xylene. The gas mixture is caused to flow through a preheater kept at 300° C., and then passed into the reactor through a porous sintered V2A-steel plate the catalyst feed thus being fluidized. The temperature in the reaction tube is controlled at 340° C. Any catalyst dust entrained with the gas is retained at the upper end of the reactor by means of a filter consisting of wire netting and quartz wool. A temperature of 200° to 250° C., i.e. a temperature above the condensation point of phthalic anhydride, is maintained in the filter zone. The gas mixture leaves the reactor after a contact time of 33 seconds. It is cooled in an air-cooled separator 1000 mm. in length and 50 mm. in diameter, the phthalic anhydride being obtained in crystalline form.

The gas, cooled at 40° C., is washed with water, the remainder of phthalic anhydride and maleic anhydride thus being absorbed. Carbon dioxide, carbon monoxide and xylene are determined analytically in the off-gas.

The following are obtained per hour:

48.4 g. of phthalic anhydride (65.8 mole percent)
0.49 g. of maleic anhydride (0.50 mole percent)
29.3 liters (S.T.P.) of carbon dioxide and carbon monoxide (32.9 mole percent)
0.42 g. of residual xylene (0.8 mole percent)

The selectivity is accordingly 2.00.

When using 7 liters per hour (S.T.P.) of hydrogen chloride, equivalent to 21% by weight of chlorine with reference to o-xylene under otherwise the same conditions, there are obtained:

48.1 g. of phthalic anhydride (65.5 mole percent)
0.63 g. of maleic anhydride (0.65 mole percent)
29.3 liters (S.T.P.) of carbon dioxide and carbon monoxide (39.8 mole percent)
0.58 g. of residual xylene (1.1 mole percent)

The selectivity is accordingly 1.99.

With 3 liters per hour (S.T.P.) of hydrogen chloride, equivalent to 9.0% by weight of chlorine with reference to o-xylene, there are obtained:

42.8 g. of phthalic anhydride (58.4 mole percent)
0.68 g. of maleic anhydride (0.7 mole percent)
35.4 liters (S.T.P.) of carbon dioxide and carbon monoxide (39.8 mole percent)
0.58 g. of residual xylene (1.1 mole percent)

The selectivity is accordingly 1.47.

If the addition of hydrogen chloride is omitted, there are obtained under otherwise identical conditions:

28.1 g. of phthalic anhydride (38.3 mole percent)
0.83 g. of maleic anhydride (0.85 mole percent)
52.6 liters (S.T.P.) of carbon dioxide and carbon monoxide (59.2 mole percent)
0.87 g. of residual xylene (1.65 mole percent)

The selectivity is accordingly 0.65.

EXAMPLE 2

3935 g. of potassium pyrosulfate and 1420 g. of sodium hydrogen sulfate ($NaHSO_4 \cdot H_2O$) are fused in a crucible furnace and heated to 350° C. 1080 g. of vanadium pentoxide and 260 g. of ceric oxide are introduced into this alkali pyrosulfate melt while stirring. When all has been introduced, the melt is kept at 350° C. for another hour.

The composition of the melt is 16.85% of $V_2O_5$, 4.05% of $CeO_2$, 61.3% of $K_2S_2O_7$, 17.8% of $Na_2S_2O_7$.

In the way described in Example 1, the catalyst is prepared from 5900 g. of the solidified and ground fused material and 7220 g. of silica gel of the grain size 60 to 200 microns, such as is known under the trade name of Silica Gel BS of BASF.

10.5 liters of this catalyst is used in the way described in Example 1. 52.7 g. of o-xylene and 600 liters (S.T.P.) of air are supplied per hour. The residence period is 32 seconds. The xylene-laden air stream has 0.87 liter (S.T.P.) of hydrogen chloride, equivalent to 1.37 g. of chlorine, metered into it per hour. The amount of chlorine is 2.6% by weight with reference to the o-xylene. The temperature of the fluidized bed is kept at 320° C.

There are obtained per hour:

43.4 g. of phthalic anhydride (59.1 mole percent)
0.78 g. of maleic anhydride (0.8 mole percent)
33.9 liters (S.T.P.) of carbon dioxide and carbon monoxide (38.1 mole percent)
1.05 g. of residual xylene (2.0 mole percent)

The selectivity is accordingly 1.56.

Without the addition of hydrogen chloride, there are obtained per hour under otherwise identical conditions:

38.1 g. of phthalic anhydride (51.8 mole percent)
1.07 g. of maleic anhydride (1.1 mole percent)
39.9 g. liters (S.T.P.) of carbon dioxide and carbon monoxide (44.8 mole percent)
1.21 g. of residual xylene (2.3 mole percent)

The selectivity accordingly is 1.15.

EXAMPLE 3

3935 g. of potassium pyrosulfate and 1420 g. of sodium hydrogen sulfate ($NaHSO_4 \cdot H_2O$), 1080 g. of vanadium pentoxide, 334 g. of ceric oxide, 39 g. of secondary ammonium sulfate, 252 g. of molybdic acid ($H_2MoO_4$) and 20 g. of silver nitrate are processed into a melt as described in Example 1.

This melts has the following composition:

16.0% of $V_2O_5$
4.95% of $CeO_2$
0.30% of $P_2O_5$
3.30% of $MoO_3$
0.20% of $Ag_2O$
58.3% of $K_2S_2O_7$
16.95% of $Na_2S_2O_7$

Using this melt with silica gel, such as is commercially available under the name Silica Gel BS of BASF, a catalyst is prepared which consists of 45% by weight of this melt and 55% by weight of silica gel (grain size 50 to 200 microns).

10.5 liters of this catalyst is used for the oxidation of o-xylene as described in Example 1. A temperature of 320° C. is maintained in the fluidized bed and 52.7 g. per hour of o-xylene and 600 liters (S.T.P.) per hour or air are supplied thereto. 0.43 liter (S.T.P.) of chlorine is mixed with the xylene-containing dry gas stream per hour. The amount of chlorine is 1.37 g. per hour, i.e., 2.6% by weight with reference to o-xylene. The residence period is 32 seconds.

There are obtained per hour:

45.5 g. of phthalic anhydride (61.8 mole percent)
0.68 g. of maleic anhydride (0.7 mole percent)
31.8 liters (S.T.P.) of carbon dioxide and carbon monoxide (35.8 mole percent)
0.90 g. of o-xylene (unreacted) (1.7 mole percent)

The selectivity is 1.73.

Under the same reaction conditions but using, instead of free chlorine, the equivalent amount of 0.86 liter (S.T.P.) of hydrogen chloride per hour, there are obtained per hour:

45.1 g. of phthalic anhydride (61.4 mole percent)
0.68 g. of maleic anhydride (0.7 mole percent)
32.1 liters (S.T.P.) of carbon dioxide and carbon monoxide (36.1 mole percent)
0.95 g. of residual xylene (1.8 mole percent)

The selectivity is 1.70.

Instead of hydrogen chloride, however, o-xylyl chloride for example may be used. Under otherwise the same conditions there is then used per hour 54.1 g. of a mixture of 90% by weight of o-xylene and 10% by weight of o-xylyl chloride. This throughput, by converting the o-xylyl chloride into o-xylene, is equivalent to the above-mentioned hourly amount of 52.7 g. of o-xylene; the amount of chlorine introduced by the xylyl chloride is 1.37 g. per hour and is equivalent to 2.6% by weight on 52.7 g. of o-xylene.

There are obtained per hour:

45.2 g. of phthalic anhydride (61.5 mole percent)
0.88 g. of maleic anhydride (0.9 mole percent)
32.0 liters (S.T.P.) of carbon dioxide and carbon monoxide (36.0 mole percent)
0.84 g. of residual xylene (1.6 mole percent)

When using, instead of xylyl chloride, the substances specified in the table below, the results are as follows:

| Additive | Weight percent supplied with reference to xylene | Weight percent of chromium supplied with reference to xylene | Phthalic anhydride (mole percent) | Selectivity |
|---|---|---|---|---|
| Chlorobenzene | 6.2 | 2.6 | 59.5 | 1.69 |
| Ethyl chloride | 4.7 | 2.6 | 61.4 | 1.71 |
| Cyclohexyl chloride | 9.4 | 2.6 | 61.0 | 1.74 |
| Acetyl chloride | 5.7 | 2.6 | 62.1 | 1.74 |
| Methyl chloride | 3.7 | 2.6 | 61.4 | 1.70 |
| Nitrosyl chloride | 4.8 | 2.6 | 61.9 | 1.72 |

The selectivity is 1.71.

Without adding chlorine or a chlorine compound, there are obtained by supplying 52.7 g. of o-xylene per hour under otherwise the same conditions:

40.3 g. of phthalic anhydride (54.8 mole percent)
1.17 g. of maleic anhydride (1.2 mole percent)
37.3 liters (S.T.P.) of carbon dioxide and carbon monoxide (41.9 mole percent)
1.2 g. of o-xylene (unreacted) (2.1 mole percent)

The selectivity is 1.31.

EXAMPLE 4

A melt is prepared from 3935 g. of potassium pyrosulfate, 1420 g. of sodium pyrosulfate ($NaHSO_4 \cdot H_2O$), 1080 g. of vanadium pentoxide, 168 g. of cupric oxide (CuO), 39 g. of $(NH_4)_2HPO_4$, 252 g. of molybdic acid ($H_2MoO_4$) and 20 g. of silver nitrate, analogously to the foregoing examples.

This melt has the following composition:

16.4% of $V_2O_5$
2.44% of CuO
0.32% of $P_2O_5$
3.42% of $MoO_3$
0.21% of $Ag_2O$
59.8% of $K_2S_2O_7$
17.3% of $Na_2S_2O_7$

Using this melt and a silica gel of the grain size 60 to 200 microns, a catalyst is prepared which consists of 45% by weight of the melt and 55% by weight of silica gel.

52.7 g. of o-xylene and 600 liters (S.T.P.) of air per hour are passed over 10.5 liters of this catalyst in the apparatus described in Example 1, the reaction temperature being kept at 320° C. The gas supplied is mixed with 3 liters (S.T.P.) per hour of hydrogen chloride, i.e., 9% by weight of chlorine with reference to o-xylene. The residence period is 32 seconds.

There are obtained per hour:

48.0 g. of phthalic anhydride (65.4 mole percent)
1.07 g. of maleic anhydride (1.1 mole percent)
28.4 liters (S.T.P.) of carbon dioxide and carbon monoxide (31.9 mole percent)
0.84 g. of residual xylene (1.6 mole percent)

The selectivity is 2.05.

Without addition of hydrogen chloride, there are obtained under otherwise the same conditions:

38.1 g. of phthalic anhydride (51.8 mole percent)
0.97 g. of maleic anhydride (1.0 mole percent)
40.2 liters (S.T.P.) of carbon dioxide and carbon monoxide (45.2 mole percent)
1.05 g. of residual xylene (2.0 mole percent)

The selectivity is 1.15.

EXAMPLE 5

Using 6 liters of the catalyst described in Example 3 the following results are achieved at an hourly throughput of 70 g. of o-xylene and 800 liters (S.T.P.) of air (equivalent to a load of 87.5 g. of o-xylene per $m.^3$ (S.T.P.) of air) with the simultaneous supply of 3.0% by weight of chlorine (with reference to o-xylene, supplied in the form of hydrogen chloride) at an oxidation temperature of 330° C. and a residence period of 14 seconds:

59.3 g. of phthalic anhydride (60.7 mole percent)
1.17 g. of maleic anhydride (0.9 mole percent)
42.2 liters (S.T.P.) of carbon dioxide and carbon monoxide (35.7 mole percent)
1.89 g. of residual xylene (2.7 mole percent)

The selectivity is 1.70.

With prolonged periods of operation, a fall in the yield is noticeable; whereas 60.7 mole percent is achieved in the first 1000 hours, the yield after 1200 hours falls to 55.3 mole percent. If 1% by weight of sulfur dioxide with reference to o-xylene is added, the yield is restored to its original value in the course of the next 300 hours and remains constant for very long periods of operation provided the supply of sulfur is continued. The amount of sulfur dioxide supplied is equivalent to 84 g. of sulfur dioxide per liter of catalyst per month.

Some results obtained are tabulated below:

| Duration of experiment in hours | 1,000 | 1,200 | 1,500 | 3,000 |
|---|---|---|---|---|
| Percent by weight of $SO_2$ supplied with reference to o-xylene | nil | 1 | 1 | 1 |
| Mole percent of phthalic anhydride | 60.7 | 53.3 | 60.6 | 60.7 |
| Mole percent of maleic anhydride | 0.9 | 1.1 | 0.9 | 0.9 |
| Mole percent of $CO_2+CO$ | 35.7 | 32.4 | 35.5 | 35.6 |
| Mole percent of residual xylene + tolualdehyde | 2.7 | 13.2 | 3.0 | 2.8 |
| Selectivity | 1.70 | 1.65 | 1.70 | 1.71 |

We claim:

1. A process for the vapor-phase catalytic oxidation of o-xylene to phthalic anhydride which comprises bringing a gas selected from the group consisting of oxygen and molecular oxygen containing gases inert under the conditions of the reaction, said gas containing 150 to 900 g. o-xylene per cubic meter S.T.P. oxygen and further containing 0.2 to 50% by weight, with reference to o-xylene, of a member selected from the group consisting of chlorine and chlorine-containing compounds being gaseous at the reaction temperature, into contact with a catalyst maintained in a fluidized condition in the approximate temperature range of 250 to 380° C., for a residence period of from 5 to 50 seconds, said catalyst being a solution applied to a porous inert carrier of 5 to 30% by weight of vanadium pentoxide with reference to the solution in a salt of pyrosulfuric acid selected from the group consisting of potassium pyrosulfate and mixtures of potassium pyrosulfate and sodium pyrosulfate in a ratio by weight of up to 1:1.

2. A process as claimed in claim 1, wherein together with the o-xylene a gas selected from the group consisting of oxygen and gases containing molecular oxygen, and a member of the group consisting of chlorine and chlorine compounds being gaseous at the reaction temperature and also $SO_3$ are brought into contact with the catalyst in an amount of 1 to 500 g. per kg. catalyst per month.

3. A process as claimed in claim 2, wherein the $SO_3$ is formed at the catalyst from sulfur containing compounds.

4. A process for the vapor-phase catalytic oxidation of o-xylene to phthalic anhydride which comprises bringing a gas selected from the group consisting of oxygen and molecular oxygen containing gases inert under the conditions of the reaction, said gas containing 150 to 900 g. o-xylene per cubic meter S.T.P. oxygen and further containing 0.2 to 50% by weight, with reference to o-xylene, of a member selected from the group consisting of chlorine and chlorine-containing compounds being gaseous at the reaction temperature, into contact with a catalyst maintained in a fluidized condition in the approximate temperature range of 250 to 380° C., for a residence period of from 8 to 30 seconds, said catalyst being a solution applied to a porous inert carrier of 5 to 30% by weight of vanadium pentoxide with reference to the solution in a salt of pyrosulfuric acid selected from the group consisting of potassium pyrosulfate and mixtures of potassium pyrosulfate and sodium pyrosulfate in a ratio by weight of up to 1:1, said solution further containing at least one member selected from the group consisting of phosphorus pentoxide, molybdenum trioxide, tungsten trioxide, silver oxide, iron oxides, nickel oxides, cobalt oxides, cerium oxide, copper oxides and manganese oxides with the provisions that the amount of phosphorous oxide does not exceed 4% by weight with reference to the solution and one-sixth that of vanadium pentoxide, the amount of molybdenum trioxide does not exceed 6% by weight of the solution, the amount of tungsten trioxide does not exceed 6% by weight of the solution and the total of molybdenum and tungsten trioxide does not exceed one-third of the weight of vanadium pentoxide, the amount of silver oxide does not exceed 3% by weight with reference to the solution and one-tenth that of vanadium pentoxide and the amounts of iron oxide, nickel oxide, cobalt oxide, cerium oxide, copper oxide and manganese oxide do not exceed 5% by weight with reference to the solution, and further the total of vanadium pentoxide, phosphorus pentoxide, molybdenum trioxide, tungsten trioxide, silver oxide, nickel oxide, iron oxide, cobalt oxide, cerium oxide, copper oxide and manganese oxide does not exceed two-thirds of the weight of the alkali pyrosulfate.

5. A process as claimed in claim 4 wherein together with the o-xylene a gas selected from the group consisting of oxygen and gases containing molecular oxygen, and a member of the group consisting of chlorine and chlorine compounds being gaseous at the reaction temperature and also $SO_3$ are brought into contact with the catalyst in an amount of 1 to 500 g. per kg. catalyst per month.

References Cited in the file of this patent

UNITED STATES PATENTS

| | | |
|---|---|---|
| 2,270,779 | Berl | Jan. 20, 1942 |
| 2,471,853 | Beach et al. | May 31, 1949 |
| 2,574,511 | Toland | Nov. 13, 1951 |
| 2,954,385 | Burney et al. | Sept. 27, 1960 |
| 2,973,371 | Chomitz et al. | Feb. 28, 1961 |
| 2,989,544 | Saunders et al. | June 20, 1961 |

OTHER REFERENCES

Sherwood: Petroleum Refiner, vol. 32, No. 3 (1953), pages 113–17.

UNITED STATES PATENT OFFICE
CERTIFICATE OF CORRECTION

Patent No. 3,167,567                      January 26, 1965

Helmut Nonnenmacher et al.

It is hereby certified that error appears in the above numbered patent requiring correction and that the said Letters Patent should read as corrected below.

Column 9, in the table, second column, opposite "Chlorobenzene", for "6.2" read -- 8.2 --.

Signed and sealed this 6th day of July 1965.

(SEAL)
Attest:

ERNEST W. SWIDER
Attesting Officer

EDWARD J. BRENNER
Commissioner of Patents